(12) United States Patent
He et al.

(10) Patent No.: US 12,326,844 B2
(45) Date of Patent: Jun. 10, 2025

(54) DATA PROCESSING METHOD AND DATA PROCESSING DEVICE

(71) Applicant: SAMSUNG ELECTRONICS CO., LTD., Suwon-si (KR)

(72) Inventors: Xing He, Suwon-si (KR); Hao Yan, Suwon-si (KR); Zhao Chen, Suwon-si (KR); Yanlong Yang, Suwon-si (KR); Yiwen Zhang, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 18/348,257

(22) Filed: Jul. 6, 2023

(65) Prior Publication Data

US 2024/0394238 A1    Nov. 28, 2024

(30) Foreign Application Priority Data

May 26, 2023   (CN) .......................... 202310610574.X (51) Int. Cl.
   *G06F 16/00*  (2019.01)
   *G06F 16/22*  (2019.01)
(52) U.S. Cl.
   CPC ................. *G06F 16/2246* (2019.01)
(58) Field of Classification Search
   None
   See application file for complete search history.

(56) References Cited

U.S. PATENT DOCUMENTS

| | | | |
|---|---|---|---|
| 8,707,213 B2* | 4/2014 | Qing | G06F 3/0238 715/811 |
| 11,449,430 B2* | 9/2022 | Park | G06F 16/24569 |
| 2013/0325902 A1* | 12/2013 | Bachar | G06F 16/9027 707/E17.044 |
| 2016/0196207 A1* | 7/2016 | Gupta | G06F 3/0652 711/103 |
| 2018/0089244 A1* | 3/2018 | Velayudhan Pillai | G06F 16/23 |
| 2018/0349095 A1* | 12/2018 | Wu | G06F 3/0643 |
| 2019/0236156 A1* | 8/2019 | Fanghaenel | G06F 16/2246 |
| 2020/0183905 A1* | 6/2020 | Wang | G06F 16/2246 |
| 2021/0342259 A1* | 11/2021 | Idreos | G06F 16/2272 |
| 2022/0067004 A1* | 3/2022 | Agrawal | G06F 16/214 |
| 2022/0129433 A1* | 4/2022 | Agrawal | G06F 16/2264 |
| 2023/0033773 A1* | 2/2023 | Choi | G06F 16/2282 |
| 2023/0229651 A1* | 7/2023 | Dayan | G06F 16/2358 707/797 |
| 2024/0394238 A1* | 11/2024 | He | G06F 16/2246 |

FOREIGN PATENT DOCUMENTS

| | | | |
|---|---|---|---|
| CN | 112486994 | | 3/2021 |
| CN | 114398007 | | 4/2022 |
| CN | 114416646 | | 4/2022 |
| CN | 114416646 A | * | 4/2022 |
| CN | 114416742 | | 4/2022 |

* cited by examiner

*Primary Examiner* — Hasanul Mobin
(74) *Attorney, Agent, or Firm* — MORGAN, LEWIS & BOCKIUS LLP (57) ABSTRACT

A data processing method and device are provided. The data processing method includes acquiring hot keys read from a log structure merge (LSM) tree within a preset duration, determining a total size of the read hot keys, and adjusting a size of each of a plurality of levels of the LSM tree based on the total size of the read hot keys.

16 Claims, 8 Drawing Sheets

DATA PROCESSING METHOD AND DATA PROCESSING DEVICE

CROSS-REFERENCE TO RELATED APPLICATIONS

The present application claims priority under 35 U.S.C. § 119 to Chinese Patent Application No. 202310610574.X, filed May 26, 2023, the entire contents of which are herein incorporated by reference.

TECHNICAL FIELD

The present disclosure relates to data processing and, more specifically to a data processing method and a device for performing the same.

DISCUSSION OF THE RELATED ART

At present, it is a very big challenge to store and access hundreds of petabytes (PB) of data. The open source RocksDB is a database used to store and access hundreds of petabytes (PB) of data, which is an open storage database of Facebook and is an embedded Key-Value (KV) database written in C++, and the RocksDB stores data using a Log Structured Merge (LSM) storage engine, in which the data exists in a form of a Sorted Sequence Table (SST) file on a storage apparatus.

However, in the related technology, for RocksDB, keys mixed and stored in the lower level during compaction (Compaction) and the read data is not kept at different levels according to the hotness, which leads to high reading amplification factor and poor reading performance, especially under heavy read workloads.

SUMMARY

A data processing method includes acquiring hot keys read from a log structure merge (LSM) tree within a preset duration. A total size of the read hot keys is determined. A size of each of a plurality of levels of the LSM tree is adjusted based on the determined total size of the read hot keys.

The acquiring of hot keys read from a log structure merge (LSM) tree within a preset duration may include determining a reading hotness threshold, and acquiring hot keys determined based on the reading hotness threshold.

The adjusting of the size of each of a plurality of levels of the LSM tree based on the total size of the read hot keys may includes determining a total size of an upper level of a current level in the plurality of levels within the preset duration, and adjusting the size of each of the plurality of levels based on the total size of the read hot keys and the total size of the upper level of the current level.

The adjusting of the size of each of the plurality of levels based on the total size of the read hot keys and the total size of the upper level of the current level may include comparing the total size of the read hot keys and the total size of the upper level of the current level to obtain a comparison result, determining whether to adjust the size of each of the plurality of levels based on the comparison result, and adjusting, when it is determined to adjust the size of each of the plurality of levels, the size of each level in the plurality of levels according to a first rule.

The determining of whether to adjust the size of each of the plurality of levels based on the comparison result may include determining to adjust the size of each of the plurality of levels, when the total size of the read hot keys is in the range of a first multiples of the total size of the upper level of the current level, determining not to adjust the size of each of the plurality of levels, when the total size of the read hot keys is in the range of a second multiples of the total size of the upper level of the current level, and when the total size of the read hot key is in a third or fourth multiples of the total size of the upper level of the current level, updating the reading hotness threshold according to the second rule, and returning to the acquiring of all hot keys determined based on the reading hotness threshold in the keys read from the LSM tree within the preset duration.

The adjusting of the size of each level in the plurality of levels according to a first rule may include reducing a size of a first number of levels from top to bottom in the plurality of levels by a first preset proportion of a first value, respectively, and increasing a size of a second number of levels from bottom to top in the plurality of levels by a second preset proportion of the first value, respectively.

The determining of a total size of an upper level of a current level in the plurality of levels within the preset duration may include determining a sum of keys in data files of all levels located above the current level in the preset duration as the total size of the upper level of the current level within the preset duration.

The method may further include acquiring a merged file that is obtained by merging a current data file in a current level in the plurality of levels and a data file overlapping with the current data file in the next level of the current level, wherein the merged file includes at least one key, determining whether each of the at least one key is a hot key or a cold key, and distributing the hot key in the at least one key to the current level, and distributing the cold key in the at least one key to the next level.

The determining of whether each of the at least one key is a hot key or a cold key may include determining whether each of the at least one key is a hot key or a cold key based on access numbers of the key.

The determining of whether each of the at least one key is a hot key or a cold key based on access numbers of a key may include determining the total size of the keys in the current data file, as a first value, acquiring the access numbers of the at least one key, determining the total size of the keys, the access numbers of which are in a preset range, in at least one key, as a second value, determining a size of a first key in a first data file arranged after the current data file in the current level, as a third value, selecting a key whose size does not exceed half of the first value from the at least one key according to an order of the access number from high to low when the first value is less than the second value, and selecting a key whose size does not exceed the second value from the at least one key according to an order of the access number from high to low when the second value is less than the first value, and determining a key less than the third value in the selected key to be the hot key, and determining a key other than the hot key in the at least one key to be the cold key.

A data processing device includes a read hot key acquisition unit, configured to acquire hot keys read from a log structure merge (LSM) tree within a preset duration, and a read size determination unit, configured to determine a total size of the read hot keys; and a level size adjusting unit, configured to adjust a size of each of a plurality of levels of the LSM tree based on the total size of the read hot keys.

The read hot key acquisition unit may be configured to determine a reading hotness threshold, and acquire hot keys determined based on the reading hotness threshold.

The level size adjusting unit may be configured to determine a total size of an upper level of a current level in the plurality of levels within the preset duration, and adjust the size of each of the plurality of levels based on the total size of the read hot keys and the total size of the upper level of the current level.

The level size adjusting unit may be configured to compare the total size of the read hot keys and the total size of the upper level of the current level to obtain a comparison result, and determine whether to adjust the size of each of the plurality of levels based on the comparison result; adjust, when it is determined to adjust the size of each of the plurality of levels, the size of each level in the plurality of levels according to a first rule.

The level size adjusting unit may be configured to determine to adjust the size of each of the plurality of levels, when the total size of the read hot keys is in the range of a first multiples of the total size of the upper level of the current level, determine not to adjust the size of each of the plurality of levels, when the total size of the read hot keys is in the range of a second multiples of the total size of the upper level of the current level, and when the total size of the read hot key is in a third or fourth multiples of the total size of the upper level of the current level, update the reading hotness threshold according to the second rule, and return to acquire of all hot keys determined based on the reading hotness threshold in the keys read from the LSM tree within the preset duration.

The level size adjusting unit may be configured to reduce a size of a first number of levels from top to bottom in the plurality of levels by a first preset proportion of a first value, respectively, and increase a size of a second number of levels from bottom to top in the plurality of levels by a second preset proportion of the first value, respectively.

The level size adjusting unit may be configured to determine a sum of keys in data files of all levels located above the current level in the preset duration as the total size of the upper level of the current level within the preset duration.

The device may further include a file acquisition unit, configured to acquire a merged file that is obtained by merging a current data file in a current level in the plurality of levels and a data file overlapping with the current data file in the next level of the current level, wherein the merged file includes at least one key, a key hot and cold determination unit, configured to determine whether each of the at least one key is a hot key or a cold key, and a key distribution unit, configured to distribute the hot key in the at least one key to the current level, and distributing the cold key in the at least one key to the next level.

The key hot and cold determination unit may be configured to determine whether each of the at least one key is a hot key or a cold key based on access numbers of the key.

The key hot and cold determination unit may be configured to determine the total size of the keys in the current data file, as a first value; acquire the access numbers of the at least one key, determining the total size of the keys, the access numbers of which are in a preset range, in at least one key, as a second value, determine a size of a first key in a first data file arranged after the current data file in the current level, as a third value, select a key whose size does not exceed half of the first value from the at least one key according to an order of the access number from high to low when the first value is less than the second value, and selecting a key whose size does not exceed the second value from the at least one key according to an order of the access number from high to low when the second value is less than the first value, and determine a key less than the third value in the selected key to be the hot key, and determine a key other than the hot key in the at least one key to be the cold key.

A computer-readable storage medium storing a computer program that, when executed by a processor, implements the data processing method described in the present disclosure.

A computing device includes at least one processor and at least one memory, storing a computer program. When the computer program is executed by the at least one processor, the data processing method described in the present disclosure is implemented.

A computer program product includes instructions executable by a processor of a computer device to accomplish the data processing method according to an example embodiment of the present disclosure.

BRIEF DESCRIPTION OF THE DRAWINGS

The above and other objectives and features of example embodiments of the present disclosure will become clearer through the following description in conjunction with the accompanying drawings that exemplarily show embodiments, in which.

DETAILED DESCRIPTION

Reference will now be made in detail to example embodiments of the present disclosure which are shown in the accompanying drawings, wherein same reference signs may refer to a same part.

Leveled compaction is a popular compaction strategy in LSM KV storage. When a size of the $n^{th}$ level exceeds its target size, a file F(sst2) of the $n^{th}$ level is selected out and is merged into a file, which has overlapping key ranges with F, in the $(n+1)^{th}$ level, in a similar way to merge sorting. During this compaction process, the keys are blended and stored in a lower level. In this case, the data must be read through a plurality of levels, so it is not read-friendly. Since the read hot and cold data are stored in a mix in each level, and the read hot data is mostly stored in the last level, the read amplification is large and the reading performance is poor.

If a KV pair with 10 or more accesses in a 24-hour period is defined as a hot KV pair, about 50% of the KV pairs with reading access are hot KV pairs, and 5% of the KV pairs with writing access are hot KV pairs. In this workload, the proportion of hot KV pairs for read operations is high, and much higher than for write operations. In a related technique, an overall combined optimization of three levels (LSM memory, storage, commit log) is used to reduce write amplification. In the optimization of the memory level, the technology separates the hot and cold key pairs, and stores all the hot key pairs in memory. According to the hotness distribution of the workload, it can be known that there are too many hot read data and cannot be stored in the memory, which consumes a lot of memory and increases the cost.

In a related technology, the benefit of recycling space for hot objects in fast storage is balanced with the cost of compaction in slow storage. When performing compaction, the hot keys are kept in upper levels and the cold keys are kept in lower levels. Since space in the Fast Level (NVM) fills up quickly, it is necessary to decide to migrate which objects from NVM to Flash. This leads to a fundamental trade-off: keeping a large number of popular objects in NVM ensures a higher percentage of access from NVM, but this comes at the cost of migration or compaction efficiency. This technique requires a trade-off between reading performance and compaction efficiency with a fixed upper-level size.

The present application proposes an optimization scheme for read-intensive workloads, dynamically adjusting the level size during the compaction process by separating the reading hot and cold keys. In this way, read amplification can be greatly reduced without sacrificing compaction efficiency, so that reading performance is increased while memory cost is also saved.

Figure 1:
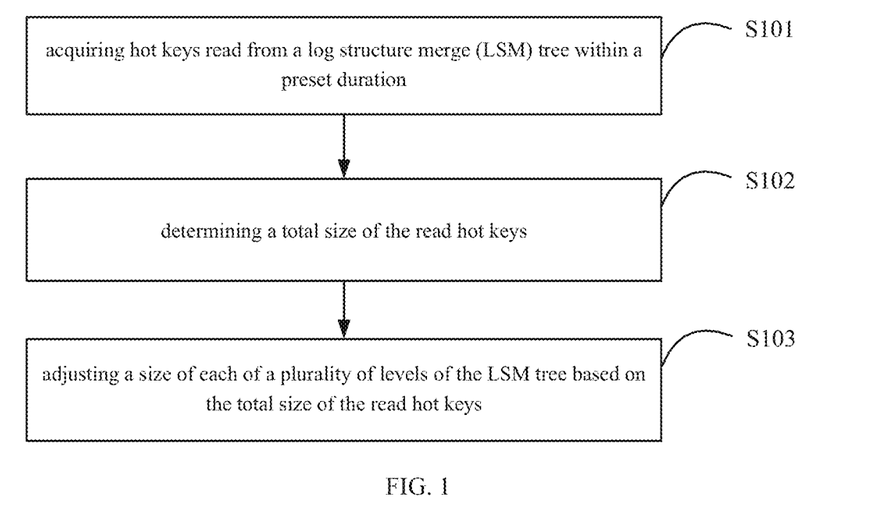
FIG. 1 is a flowchart of a data processing method according to an example embodiment of the present disclosure.

FIG. 1 is a flowchart of a data processing method according to an example embodiment of the present disclosure.

Referring to FIG. 1, in step S101, hot keys read from a log structure merge (LSM) tree within a preset duration are acquired.

In an embodiment of the present disclosure, the acquiring of hot keys read from a LSM tree within a preset duration may include determining a reading hotness threshold, and acquiring all hot keys determined based on the reading hotness threshold in the keys read from the LSM tree within the preset duration, as the hot keys read from the LSM tree within the preset duration.

In step S102, a total size of the read hot keys is determined.

In step S103, a size of each of a plurality of levels of the LSM tree is adjusted based on the total size of the read hot keys.

In an embodiment of the present disclosure, in adjusting a size of each of a plurality of levels of the LSM tree based on the total size of the read hot keys, a total size of an upper level of a current level (for example, level 4) in the plurality of levels within the preset duration may be determined at first, and then the size of each of the plurality of levels is adjusted based on the total size of the read hot keys and the total size of the upper level of the current level.

In an embodiment of the present disclosure, in the adjusting of the size of each of the plurality of levels based on the total size of the read hot keys and the total size of the upper level of the current level, the total size of the read hot keys and the total size of the upper level of the current level may be compared to obtain a comparison result at first, and then it is determined whether to adjust the size of each of the plurality of levels based on the comparison result and when it is determined to adjust the size of each of the plurality of levels, the size of each level in the plurality of levels is adjusted according to a first rule.

In an embodiment of the present disclosure, in the determining of whether to adjust the size of each of the plurality of levels based on the comparison result, at first, it may be determined to adjust the size of each of the plurality of levels, when the total size of the read hot keys is in the range of a first multiples of the total size of the upper level of the current level. Then, it is determined not to adjust the size of each of the plurality of levels, when the total size of the read hot keys is in the range of a second multiples of the total size of the upper level of the current level; when the total size of the read hot key is in a third or fourth multiples of the total size of the upper level of the current level, the reading hotness threshold is adjusted according to the second rule, and it returns to perform the acquiring of all hot keys determined based on the reading hotness threshold in the keys read from the LSM tree within the preset duration.

For example, the range of the first multiples may be $b \times L\_Size > T\_Size > c \times L\_Size$. The range of the second multiples may be $a \times L\_Size < T\_Size < b \times L\_Size$. The range of the third multiples may be $T\_Size < a \times L\_Size$. The range of the fourth multiples may be $T\_Size > c \times L\_Size$.

The second rule may be updating the reading hotness threshold to predetermined multiples of the original value. For example, the second rule may be $T = c1 \times T$ or $T = c2 \times T$ and so on.

In an embodiment of the present disclosure, in the adjusting of the size of each level in the plurality of levels according to a first rule, at first, a size of a first number of levels from top to bottom in the plurality of levels may be reduced by a first preset proportion of a first value, respectively, and a size of a second number of levels from bottom to top in the plurality of levels may be increased by a second preset proportion of the first value, respectively.

For example, the sizes of levels 1 to 5 of the 6 levels may be increased by the first preset proportion of the first value (T_Size), and the size of level 6 of the 6 levels may be reduced by the second preset proportion of the first value (T_Size).

As an example, the level1 by $k1 \times T\_Size$ ($k1=0.01$); the level2 is increased by $k2 \times T\_Size$ ($k2=0.1$); the level3 is increased by $k3 \times T\_Size$ ($k3=0.2$); the level4 is increased by $k4 \times T\_Size$ ($k4=0.3$); the level5 is increased by $k5 \times T\_Size$ ($k5=0.39$); and the level 6 is reduced by T_Size. It should be understood that k1, k2, . . . , k5, etc. may be other values, and the present disclosure is not necessarily limited to using these.

In an embodiment of the present disclosure, in the determining of a total size of an upper level of a current level (for example, level4) in the plurality of levels within the preset duration, a sum of keys in data files of all levels (for example, level1, level2, level3) located above the current level in the preset duration may be determined as the total size of the upper level of the current level within the preset duration.

Figure 2:
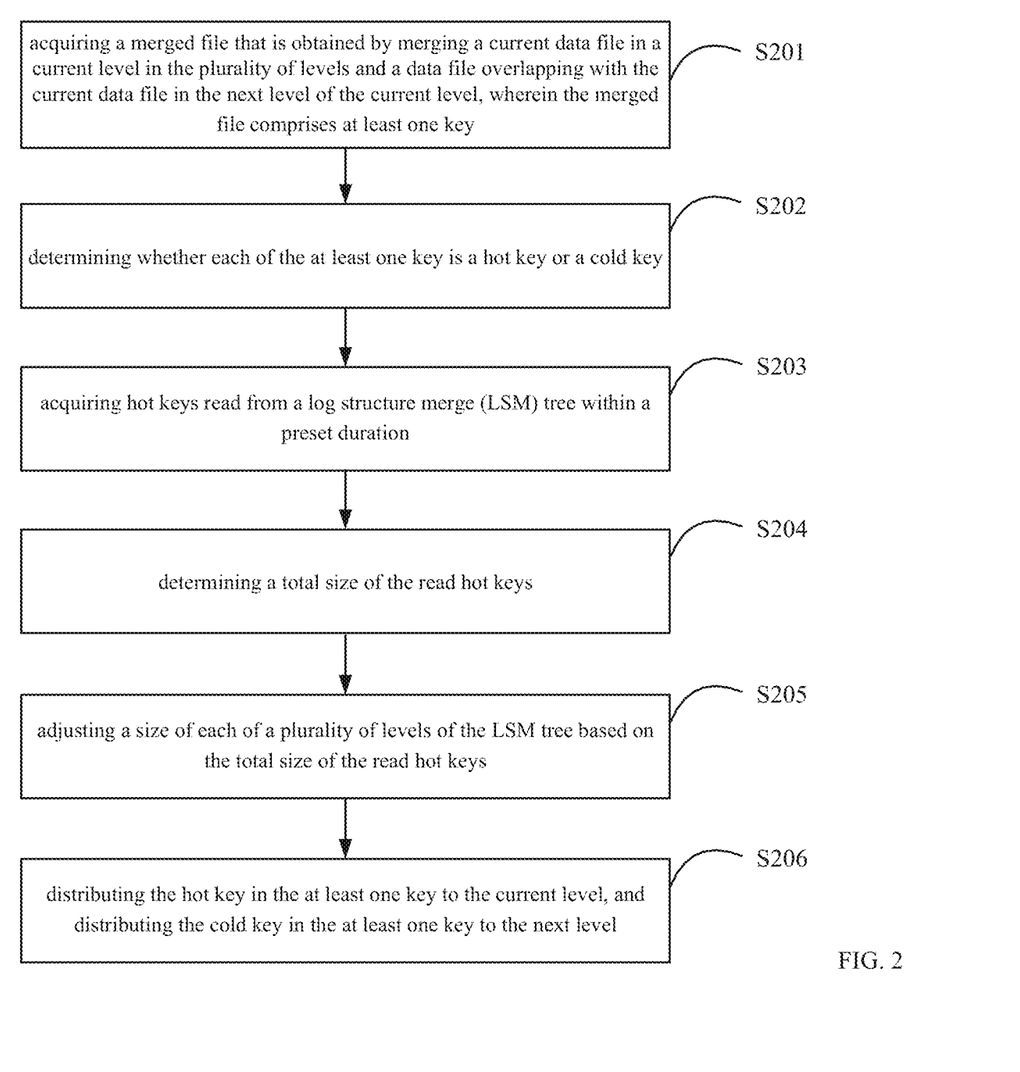
FIG. 2 is a flowchart of a data processing method according to an example embodiment of the present disclosure.

FIG. 2 is a flowchart of a data processing method according to an example embodiment of the present disclosure.

Referring to FIG. 2, in step S201, a merged file that is obtained by merging a current data file in a current level in the plurality of levels and a data file overlapping with the current data file in the next level of the current level is acquired. Herein, the merged file includes at least one key. Herein, the merged file includes at least one key (for example, key7, key10, key11, key15, key26, key27). The current data file in the current level is the data file selected for merging.

In step S202, whether each of the at least one key is a hot key or a cold key is determined.

In an embodiment of the present disclosure, in the determining of whether each of the at least one key is a hot key or a cold key, it may be determined whether each of the at least one key is a hot key or a cold key based on access numbers of the key (e.g., a number of times the key has been accessed).

In an embodiment of the present disclosure, in the determining of whether each of the at least one key is a hot key or a cold key based on access numbers of a key, at first, the total size of the keys in the current data file may be determined as a first value, the access numbers of the at least one key may be acquired, the total size of the keys, the access numbers of which are in a preset range, in at least one key, may be determined as a second value, and a size of a first key in a first data file arranged after the current data file in the current level may be determined as a third value. Then, when the first value is less than the second value, a key whose size does not exceed half of the first value is selected from the at least one key according to an order of the access number from high to low, and when the second value is less than the first value, a key whose size does not exceed the second value is selected from the at least one key according to an order of the access number from high to low. Thereafter, a key less than the third value in the selected key is determined to be the hot key, and a key other than the hot key in the at least one key is determined to be the cold key.

For example, when determining whether each of the at least one key is a hot key or a cold key, a total size (S) of a deleted file in upper level may be acquired first, and a size K of the first key of the first file on the right of the deleted file may be recorded. After that, the access numbers may be queried in the hotness table, the data may be sorted from high to low and the top 20% (this value can be dynamically adjusted according to the actual application) may be selected, and the total size S2 of the top 20% may be calculated. Then, keys whose total size does not exceed the smaller of S/2 and S2 (for example, S/2<S2, select keys whose total size does not exceed S/2; when S2<S/2, select keys whose total size does not exceed S2) may be selected. If a key is not found in the table, it does not participate in the sorting and simply sets its flag bit to 0 (recognized as a cold key) before judging the next key. If a key is greater than K, the flag bit is directly set to 0 (cold) to ensure that the upper level is still in order after the file produced by writing back the hot keys, otherwise the flag bit is set to 1 (hot), and then a next key is determined.

In step S203, hot keys read from a log structure merge (LSM) tree within a preset duration are acquired.

In an embodiment of the present disclosure, in the acquiring of hot keys read from a LSM tree within a preset duration, at first, a reading hotness threshold may be determined, and then all hot keys determined based on the reading hotness threshold in the keys read from the LSM tree within the preset duration are acquired as the hot keys read from the LSM tree within the preset duration.

In step S204, a total size of the read hot keys is determined.

In step S205, a size of each of a plurality of levels of the LSM tree is adjusted based on the total size of the read hot keys.

In an embodiment of the present disclosure, in the adjusting of a size of each of a plurality of levels of the LSM tree based on the total size of the read hot keys, at first, a total size of an upper level of a current level (for example, level4) in the plurality of levels within the preset duration may be determined, and then the size of each of the plurality of levels may be adjusted based on the total size of the read hot keys and the total size of the upper level of the current level.

In an embodiment of the present disclosure, in the adjusting of the size of each of the plurality of levels based on the total size of the read hot keys and the total size of the upper level of the current level, at first, the total size of the read hot keys and the total size of the upper level of the current level are compared to obtain a comparison result, then it is determined whether to adjust the size of each of the plurality of levels based on the comparison result, and when it is determined to adjust the size of each of the plurality of levels, the size of each level in the plurality of levels is adjusted according to a first rule.

In an embodiment of the present disclosure, in the determining whether to adjust the size of each of the plurality of levels based on the comparison result, at first, it is determined to adjust the size of each of the plurality of levels, when the total size of the read hot keys is in the range of a first multiples of the total size of the upper level of the current level. Then, it is determined not to adjust the size of each of the plurality of levels, when the total size of the read hot keys is in the range of a second multiples of the total size of the upper level of the current level; when the total size of the read hot key is in a third or fourth multiples of the total size of the upper level of the current level, the reading hotness threshold is updated according to the second rule, and it returns to perform the acquiring of all hot keys determined based on the reading hotness threshold in the keys read from the LSM tree within the preset duration.

For example, the range of the first multiples may be $b \times L\_Size > T\_Size > c \times L\_Size$. The range of the second multiples may be $a \times L\_Size < T\_Size < b \times L\_Size$. The range of the third multiples may be $T\_Size < a \times L\_Size$. The range of the fourth multiples may be $T\_Size > c \times L\_Size$.

The second rule may be updating the reading hotness threshold to predetermined multiples of the original value. For example, the second rule may be $T = c1 \times T$ or $T = c2 \times T$ and so on.

In an embodiment of the present disclosure, in the adjusting of the size of each level in the plurality of levels according to a first rule, a size of a first number of levels from top to bottom in the plurality of levels may be reduced by a first preset proportion of a first value, respectively, and a size of a second number of levels from bottom to top in the plurality of levels may be increased by a second preset proportion of the first value, respectively.

For example, the sizes of levels 1 to 5 of the 6 levels may be increased by the first preset proportion of the first value (T_Size), and the size of level 6 of the 6 levels may be reduced by the second preset proportion of the first value (T_Size).

As an example, the level1 by k1×T_Size (k1=0.01); the level2 is increased by k2×T_Size (k2=0.1); the level3 is increased by k3×T_Size (k3=0.2); the level4 is increased by k4×T_Size (k4=0.3); the level5 is increased by k5×T_Size (k5=0.39); the level 6 is reduced by T_Size. It should be understood that k1, k2, ..., k5, etc. may be other values, and the present disclosure is not necessarily limited to using these.

In an embodiment of the present disclosure, in the determining of a total size of an upper level of a current level (for example, level4) in the plurality of levels within the preset duration, a sum of keys in data files of all levels (for example, level1, level2, level3) located above the current level in the preset duration may be determined as the total size of the upper level of the current level within the preset duration.

In step S206, the hot key in the at least one key is distributed to the current level, and the cold key in the at least one key is distributed to the next level.

As time goes on, by dynamically adjusting the size of each level, the read hot keys (hot data) are constantly moving to the upper level. The upper level retains most of the read and write hot keys (hot data), thereby reducing read amplification without sacrificing compression efficiency.

Figure 3:
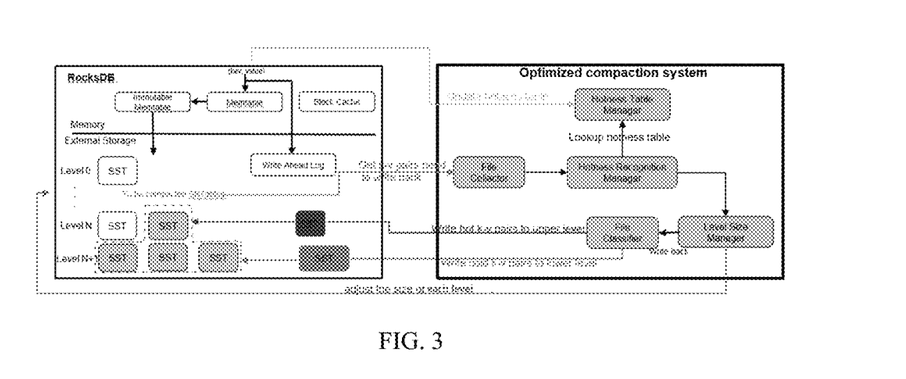
FIG. 3 is a schematic diagram of a data processing system according to an example embodiment of the present disclosure.

FIG. 3 is a schematic diagram of a data processing system according to an example embodiment of the present disclosure.

As shown in FIG. 3, the data processing system includes a hotness table manager, a file collector, a hotness recognition manager, a level size manager, and a file classifier.

The hotness table manager needs to maintain and update a hotness table when performing operations such as reading or scanning. The hotness table is maintained in a memory and records keys and the total access numbers of the keys, which represents the hotness of the keys. The memory occupied by the hotness table is less than M.

Figure 4:
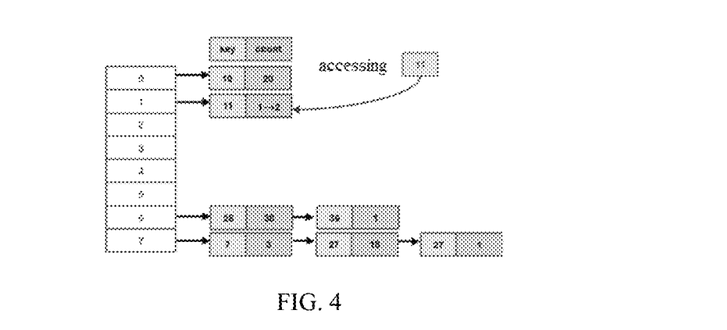
FIG. 4 is a schematic diagram of an increasing of access numbers according to an example embodiment of the present disclosure.

FIG. 4 is a schematic diagram of an increasing of access numbers according to an example embodiment of the present disclosure. As shown in FIG. 4, when the key11 is accessed, the access numbers of the key11 is increased by 1.

The file collector is used to collect files (keys) that are merged from two adjacent levels during compression. These files (keys) are used as input data for the hotness manager. In the compression process, when a hot KV pair is written back to an upper level, a lot of small files (for example, sst13, sst15) will be generated, in order to prevent the file written back to the upper level from getting smaller and smaller, it may be determined whether the file (O1) selected by the upper level is less than ⅓ of target_file_size_base (P), if so, then a file is selected to merge with the overlapping file of the lower level.

Figure 5:
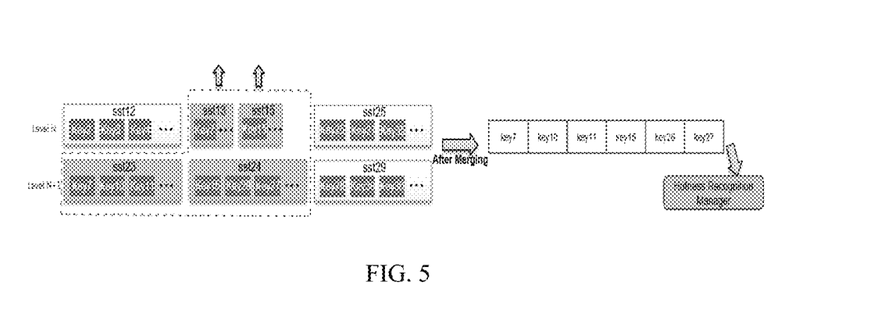
FIG. 5 is a schematic diagram of merging of two files with overlapping files in a next lower level according to an example embodiment of the present disclosure.

FIG. 5 is a schematic diagram of merging of two files with overlapping files in a next lower level according to an example embodiment of the present disclosure. As shown in FIG. 5, the selected file sst13 is a small file, i.e., file sst13 is less than ⅓ of target_file_size_base (P). Therefore, file sst15 as well as file sst13 are selected to merge with overlapping files at the lower level.

Figure 6:
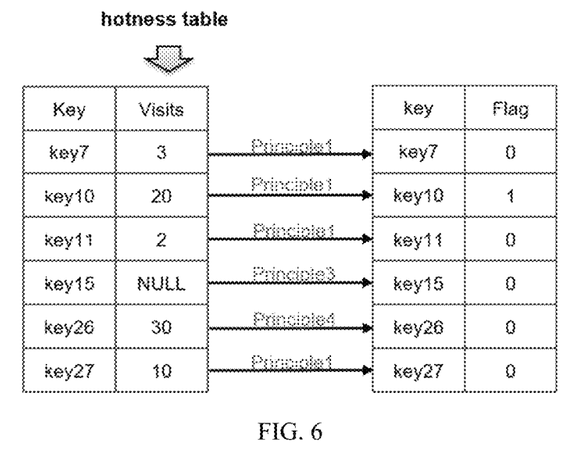
FIG. 6 is a schematic diagram of determining the hotness of a key by a hotness manager according to an example embodiment of the present disclosure.

FIG. 6 is a schematic diagram of determining the hotness of a key by a hotness manager according to an example embodiment of the present disclosure. As shown in FIG. 6, the hotness manager determines the hotness of a key according to the following principles:

Principle 1: Selecting keys with the top 20% of access numbers.

For example, as shown in FIG. 6, when there are a total of 6 KV pairs written back, because 6*20%=1.2, which is rounded down to 1, the key10 with the highest number of access numbers is selected.

Principle 2: The total size of selected hot keys cannot exceed half of the size of deleted files in the upper level.

For example, because the deleted file (sst13+sst15) contains 2 KV pairs, 2/2=1, select 1 KV pair as a hot key.

Principle 3: A key that is not queried in the hotness table can be treated as a cold key (flag bit Flag=0).

For example, key15 does not exist in the hotness table, so its flag bit Flag is 0.

Principle 4: If a key can be no less than the size of a first key of a first file to the right of the file selected by the upper level for compression, it is treated as a cold key (flag bit Flag=0). This point ensures that the upper level is still in its correct order after the file generated by the hot key is written back. For example, key26>key25 (the first key in the sst25 file), then the flag bit of key26 is Flag=0.

The hotness recognition manager can do the following operation when determining the hotness of a key:

1. Acquiring all KV pairs that need to be written back after merging during the compression process;
2. Acquiring the total size (S) of the deleted files in the upper level, and recording the size K of the first key of the first file on its right;
3. Querying the access numbers in the hotness table, sorting from high to low, selecting the top 20% (this value can be dynamically adjusted according to the actual application), and calculating the total size S2 of the top 20%. Those keys whose total size does not exceed the smaller of S/2 and S2 may be selected;
4. If a key is not found in the table, it does not participate in sorting. Its flag bit is directly set to be 0 (recognized as a cold key), and then a next key is determined; and
5. If a key is greater than K, directly setting the flag bit to 0 (cold), otherwise setting it to 1 (hot), and then determining a next key.

The level size manager dynamically changes the size of each level based on the size of the read hot data by adjusting the sizes of levels and reading hotness threshold T.

The level size manager can do the following operation when dynamically changing the size of each level:

1. Calculating the total size (L_Size) of the first N−1 upper levels in time t. L_Size characterizes the total size of the data in time t for the first N−1 upper levels, which are the N−1 levels above the Nth level. Time t can be for example, but not necessarily limited to 5 s.
2. Setting the reading hotness threshold T. If the access numbers of a read key is greater than T, this read key is regarded as a hot key.
3. Calculating the total size (T_Size) of all read hot data in time t. T_Size characterize the total size of all read hot data in time t.
4. Determining a relationship between L_Size and T_Size.

If b×L_Size>T_Size>c×L_Size, adjusting the size of each level according to rule R;

If T_Size<a×L_Size, then T=c1×T, and jumping to perform above operation 2;

If T_Size>c×L_Size, then T=c2×T, and jumping to perform above operation 2;

If a×L_Size<T_Size<b×L_Size, it ends.

As an example, c1=0.5, c2=2, a=0.1, b=0.5, c=0.8 (these parameters can be adjusted dynamically, c1<1, c2>1).

Figure 7:
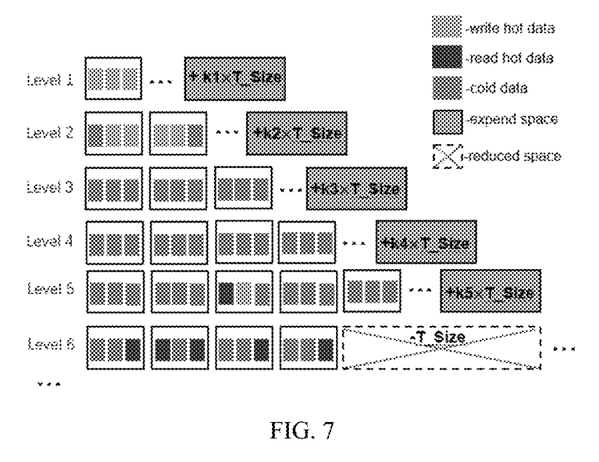
FIG. 7 is an example of a rule R for adjusting the size of each level according to an example embodiment of the present disclosure.

FIG. 7 is an example of a rule R for adjusting the size of each level according to an example embodiment of the present disclosure. As shown in FIG. 7, the following adjustments can be made according to Rule R, which adjusts the size of each level:

increasing level1 by k1×T_Size (k1=0.01);
increasing level2 by k2×T_Size (k2=0.1);
increasing level3 by k3×T_Size (k3=0.2);
increasing level4 by k4×T_Size (k4=0.3);
increasing level5 by k5×T_Size (k5=0.39); and
reducing level6 by T_Size.

It should be understood that the sizes of k1, k2, . . . , k5, etc. may be adjusted dynamically.

File classifier is used to distribute keys based on hotness. Files (SSTables) generated by hot keys (Flag=1) are written back to the upper levels, while files (SSTables) generated by cold keys (Flag=0) are written back to the lower levels. Therefore, most of the reading of hot keys a hit in the upper levels, which will reduce read amplification.

Figure 8:
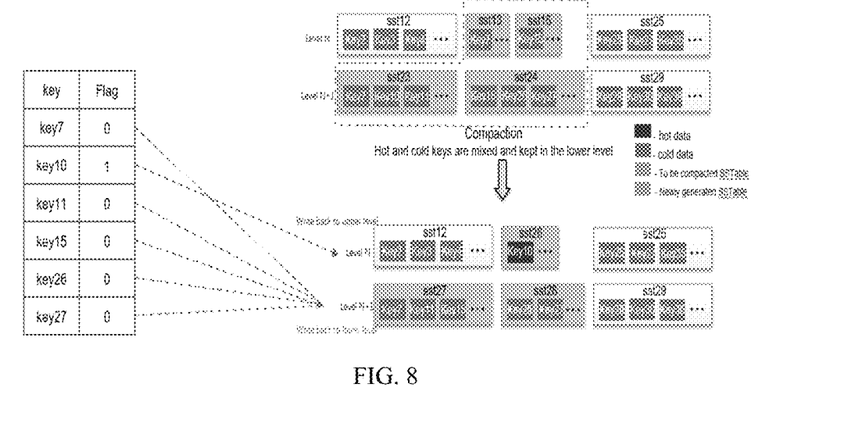
FIG. 8 is a schematic diagram of distributing keys by a file classifier according to an example embodiment of the present disclosure.

FIG. 8 is a schematic diagram of distributing keys by a file classifier according to an example embodiment of the present disclosure. As shown in FIG. 8, the hot key key10 is written back to file sst26 of an upper level (i.e., level N), and key7, key11, key15, key26, key27 are written back to file sst27 or file sst28 of a lower level (i.e., level N+1).

Figure 9:
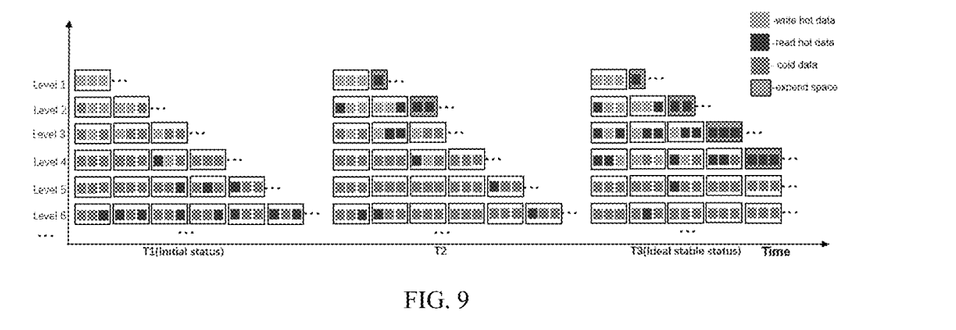
FIG. 9 is a schematic diagram of the moving upward of read hot data according to an example embodiment of the present disclosure.

FIG. 9 is a schematic diagram of the moving upward of read hot data according to an example embodiment of the present disclosure. As shown in FIG. 9, at time T1, upper levels are occupied by the hot data that is written (i.e., the written hot data), and most of the hot data that is read (i.e., the read hot data) is stored in lower levels.

As time goes on, T1→T2→T3, the read hot data gradually moves from a lower level to an upper level, and occupies an upper level together with the written hot data by expanding the sizes of upper levels and reducing the sizes of upper levels.

Figure 10:
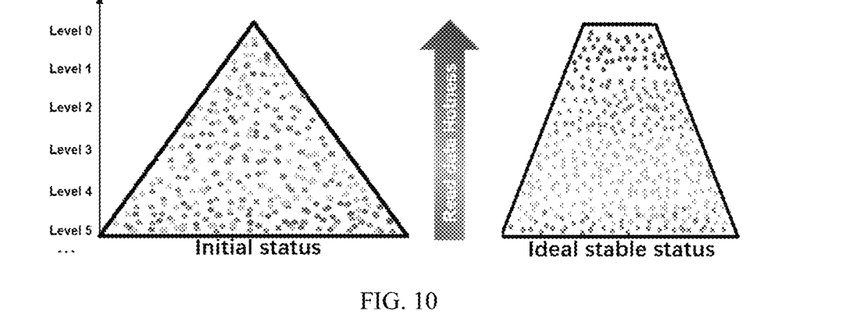
FIG. 10 is a schematic diagram of hotness distribution of read data in a LSM tree according to an example embodiment of the present disclosure.

FIG. 10 is a schematic diagram of hotness distribution of read data in a LSM tree according to an example embodiment of the present disclosure. As shown in FIG. 10, as time goes on, through the optimization of the present technology, the read data of which the hotness distribution is scattered can be changed to a hierarchical distribution of hotness.

In addition, according to the example embodiments of the present disclosure, a computer readable storage medium stored with a computer program is provided. When the computer program is executed, the method for transmitting the physical uplink shared channel (PUSCH) according to the present disclosure is implemented.

In an example embodiment of the present disclosure, the computer readable storage medium can store one or more programs that, when executed, the follow steps may be implemented: acquiring hot keys read from a log structure merge (LSM) tree within a preset duration; determining a total size of the read hot keys; and adjusting a size of each of a plurality of levels of the LSM tree based on the total size of the read hot keys, thereby increasing data reading performance by adjusting the size of levels.

In an example embodiment of the present disclosure, the computer readable storage medium can store one or more programs that, when executed, the following steps may be implemented: acquiring a merged file that is obtained by merging a current data file in a current level in the plurality of levels and a data file overlapping with the current data file in the next level of the current level, wherein the merged file includes at least one key; determining whether each of the at least one keys is a hot key or a cold key; acquiring hot keys read from a log structure merge (LSM) tree within a preset duration; determining a total size of the read hot keys; adjusting a size of each of a plurality of levels of the LSM tree based on the total size of the read hot keys; and distributing the hot key in the at least one key to the current level, and distributing the cold key in the at least one key to the next level, thereby increasing data reading performance.

The computer readable storage medium may be, for example, but not necessarily limited to, an electronic, magnetic, optical, electromagnetic, infrared, or semiconductor system, device, or, equipment or any combination of the above. More specific examples of computer readable storage media may include, but are not necessarily limited to, electrical connections having one or more wires, portable computer disks, hard disks, random access memory (RAM), read only memory (ROM), erasable Programmable read only memory (EPROM or flash memory), optical fiber, portable compact disk read only memory (CD-ROM), optical storage device, magnetic storage device, or any suitable combination of the above mentioned. In an embodiments of the present disclosure, a computer readable storage medium may be any tangible medium that can contain or store a computer program, which can be used by or in connection with an instruction execution system, device, or, equipment. The computer program embodied on the computer readable storage medium can be transmitted by any suitable medium, including but not necessarily limited to wire, fiber optic cable, RF (radio frequency), etc., or any suitable combination of the foregoing. The computer readable storage medium can be included in any device; it can also be present separately and not incorporated into the device.

In addition, according to an example embodiment of the present disclosure, there is provided a computer program product, the instructions in the computer program product may be executable by a processor of a computer device to accomplish the data processing method according to an example embodiment of the present disclosure.

The data processing method according to the example embodiments of the present disclosure has been described above with reference to FIGS. 1-10. Hereinafter, a data processing device according to the example embodiments of the present disclosure will be described with reference to FIGS. 11 and 12.

Figure 11:
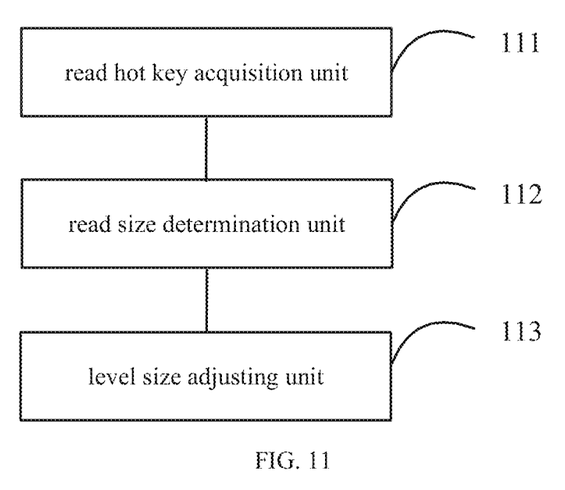
FIG. 11 is a block diagram of a data processing device according to one example embodiment of the present disclosure.

FIG. 11 is a block diagram of a data processing device according to one example embodiment of the present disclosure.

Referring to FIG. 11, the data processing device includes a read hot key acquisition unit 111, a read size determination unit 112 and a level size adjusting unit 113.

The read hot key acquisition unit 111 is configured to acquire hot keys read from a log structure merge (LSM) tree within a preset duration.

In an example embodiment of the present disclosure, the read hot key acquisition unit 111 may be configured to: determine a reading hotness threshold; acquire all hot keys determined based on the reading hotness threshold in the keys read from the LSM tree within the preset duration, as the hot keys read from the LSM tree within the preset duration.

The read size determination unit 112 is configured to determine a total size of the read hot keys.

The level size adjusting unit 113 is configured to adjust a size of each of a plurality of levels of the LSM tree based on the total size of the read hot keys.

In an example embodiment of the present disclosure, the level size adjusting unit 113 may be configured to: determine a total size of an upper level of a current level in the plurality of levels within the preset duration; and adjust the size of each of the plurality of levels based on the total size of the read hot keys and the total size of the upper level of the current level.

In an example embodiment of the present disclosure, the level size adjusting unit 113 may be configured to: compare the total size of the read hot keys and the total size of the upper level of the current level to obtain a comparison result; determine whether to adjust the size of each of the plurality of levels based on the comparison result; and adjust, when it is determined to adjust the size of each of the plurality of levels, the size of each level in the plurality of levels according to a first rule.

In an example embodiment of the present disclosure, the level size adjusting unit 113 may be configured to: determine to adjust the size of each of the plurality of levels, when the total size of the read hot keys is in the range of a first multiples of the total size of the upper level of the current level; determine not to adjust the size of each of the plurality of levels, when the total size of the read hot keys is in the range of a second multiples of the total size of the upper level of the current level; when the total size of the read hot key is in a third or fourth multiples of the total size of the upper level of the current level, update the reading hotness threshold according to the second rule, and return to acquire of all hot keys determined based on the reading hotness threshold in the keys read from the LSM tree within the preset duration.

In an example embodiment of the present disclosure, the level size adjusting unit 113 may be configured to: reduce a size of a first number of levels from top to bottom in the plurality of levels by a first preset proportion of a first value, respectively; increase a size of a second number of levels from bottom to top in the plurality of levels by a second preset proportion of the first value, respectively.

In an example embodiment of the present disclosure, the level size adjusting unit 113 may be configured to: determine a sum of keys in data files of all levels located above the current level in the preset duration as the total size of the upper level of the current level within the preset duration.

Figure 12:
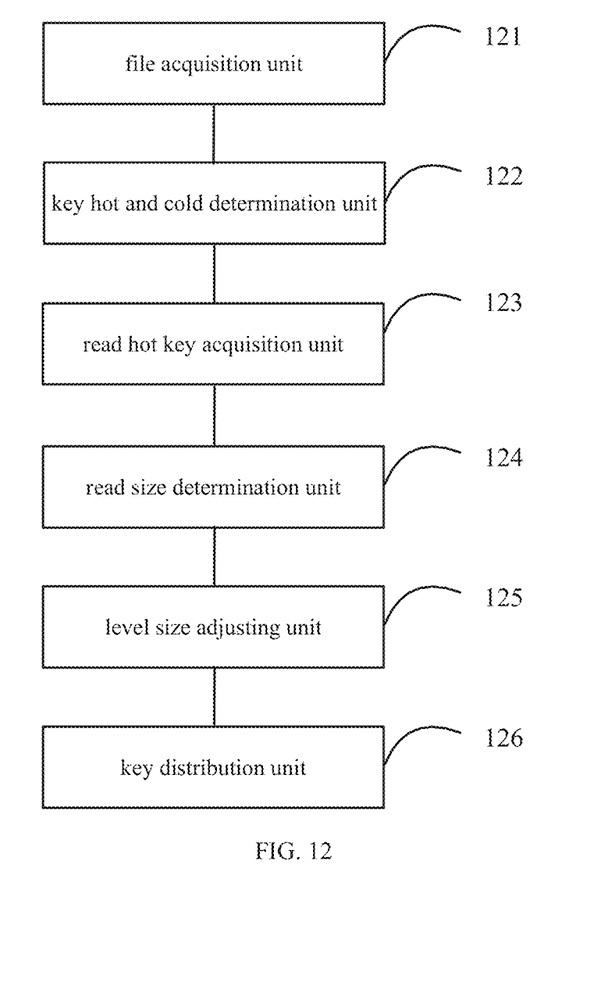
FIG. 12 is a block diagram of a data processing device according to an example embodiment of the present disclosure.

FIG. 12 is a block diagram of a data processing device according to an example embodiment of the present disclosure.

Referring to FIG. 12, the data processing device includes a file acquisition unit 121, a key hot and cold determination unit 122, a read hot key acquisition unit 123, a read size determination unit 124, a level size adjusting unit 125 and a key distribution unit 126.

The file acquisition unit 121 is configured to acquire a merged file that is obtained by merging a current data file in a current level in the plurality of levels and a data file overlapping with the current data file in the next level of the current level. Herein, the merged file includes at least one key.

The key hot and cold determination unit 122 is configured to determine whether each of the at least one key is a hot key or a cold key.

In an example embodiment of the present disclosure, the key hot and cold determination unit 122 may be configured to: determine whether each of the at least one key is a hot key or a cold key based on access numbers of the key.

In an example embodiment of the present disclosure, the key hot and cold determination unit 122 may be configured to: determine the total size of the keys in the current data file, as a first value; acquire the access numbers of the at least one key, determining the total size of the keys, the access numbers of which are in a preset range, in at least one key, as a second value; determine a size of a first key in a first data file arranged after the current data file in the current level, as a third value; and select a key whose size does not exceed half of the first value from the at least one key according to an order of the access number from high to low when the first value is less than the second value, and selecting a key whose size does not exceed the second value from the at least one key according to an order of the access number from high to low when the second value is less than the first value; determine a key less than the third value in the selected key to be the hot key, and determine a key other than the hot key in the at least one key to be the cold key.

The read hot key acquisition unit 123 is configured to acquire hot keys read from a log structure merge (LSM) tree within a preset duration.

In an example embodiment of the present disclosure, the read hot key acquisition unit 123 may be configured to: determine a reading hotness threshold; and acquire all hot keys determined based on the reading hotness threshold in the keys read from the LSM tree within the preset duration, as the hot keys read from the LSM tree within the preset duration.

The read size determination unit 124 is configured to determine a total size of the read hot keys.

The level size adjusting unit 125 is configured to adjust a size of each of a plurality of levels of the LSM tree based on the total size of the read hot keys.

In an example embodiment of the present disclosure, the level size adjusting unit 125 may be configured to: determine a total size of an upper level of a current level in the plurality of levels within the preset duration; adjust the size of each of the plurality of levels based on the total size of the read hot keys and the total size of the upper level of the current level.

In an example embodiment of the present disclosure, the level size adjusting unit 125 may be configured to: compare the total size of the read hot keys and the total size of the upper level of the current level to obtain a comparison result; determine whether to adjust the size of each of the plurality of levels based on the comparison result; and adjust, when it is determined to adjust the size of each of the plurality of levels, the size of each level in the plurality of levels according to a first rule.

In an example embodiment of the present disclosure, the level size adjusting unit 125 may be configured to: determine to adjust the size of each of the plurality of levels, when the total size of the read hot keys is in the range of a first multiples of the total size of the upper level of the current level; determine not to adjust the size of each of the plurality of levels, when the total size of the read hot keys is in the range of a second multiples of the total size of the upper level of the current level; and when the total size of the read hot key is in a third or fourth multiples of the total size of the upper level of the current level, update the reading hotness threshold according to the second rule, and return to acquire of all hot keys determined based on the reading hotness threshold in the keys read from the LSM tree within the preset duration.

In an example embodiment of the present disclosure, the level size adjusting unit 125 may be configured to: reduce a size of a first number of levels from top to bottom in the plurality of levels by a first preset proportion of a first value, respectively; and increase a size of a second number of levels from bottom to top in the plurality of levels by a second preset proportion of the first value, respectively.

In an example embodiment of the present disclosure, the level size adjusting unit 125 may be configured to: determine a sum of keys in data files of all levels located above the current level in the preset duration as the total size of the upper level of the current level within the preset duration.

The key distribution unit 126 is configured to distribute the hot key in the at least one key to the current level, and distributing the cold key in the at least one key to the next level.

The data processing device according to the example embodiments of the present disclosure has been described above with reference to FIGS. 11 and 12. Hereinafter, a computing device according to the example embodiments of the present disclosure will be described with reference to FIG. 13.

Figure 13:
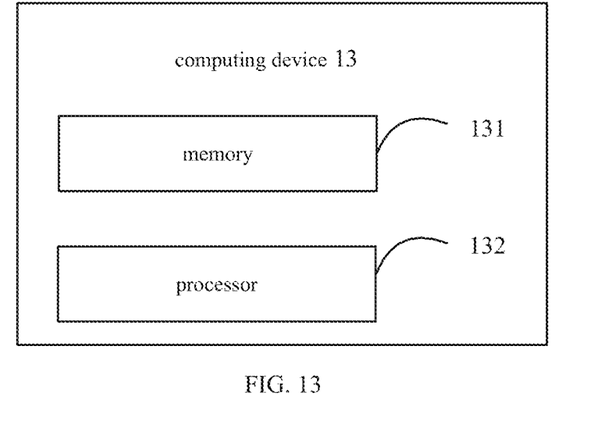
FIG. 13 is a schematic diagram of a computing device according to an example embodiment of the present disclosure.

FIG. 13 is a schematic diagram of a computing device according to an example embodiment of the present disclosure.

Referring to FIG. 13, the computing device 13 according to an example embodiment of the present disclosure includes a memory 131, a processor 132, and a computer program which is stored on the memory 131, and when the computer program is executed by the processor 132, a data processing method according to the present disclosure is implemented.

In an example embodiment of the present disclosure, when the computer program is executed by a processor 132, the follow steps may be implemented: acquiring hot keys read from a log structure merge (LSM) tree within a preset duration; determining a total size of the read hot keys; and adjusting a size of each of a plurality of levels of the LSM tree based on the total size of the read hot keys.

In an example embodiment of the present disclosure, when the computer program is executed by a processor 132, the follow steps may be implemented: acquiring a merged file that is obtained by merging a current data file in a current level in the plurality of levels and a data file overlapping with the current data file in the next level of the current level, wherein the merged file includes at least one key; determining whether each of the at least one key is a hot key or a cold key; acquiring hot keys read from a log structure merge (LSM) tree within a preset duration; determining a total size of the read hot keys, adjusting a size of each of a plurality of levels of the LSM tree based on the total size of the read hot keys; and distributing the hot key in the at least one key to the current level, and distributing the cold key in the at least one key to the next level.

The computing device in embodiments of the present disclosure may include, but are not necessarily limited to including, devices such as mobile phones, notebook computers, Personal Digital Assistants (PDAs), tablet PCs (PADs), desktop computers, and the like. The computing device illustrated in FIG. 13 is merely an example and should not necessarily impose limitations on the function and scope of use of embodiments of the present disclosure.

The data processing method and device according to an example embodiment of the present disclosure have been described above with reference to FIGS. 1-13. However, it should be understood that the data processing device and units therein shown in FIGS. 11 and 12 may be respectively configured as software, hardware, firmware for performing a specific function or any combination thereof. The computing device as shown in FIG. 13 is not necessarily limited to include the components shown above, but some components may be added or deleted as needed, and the above components may also be combined.

According to the data processing method and device of an example embodiment of the present disclosure, by acquiring hot keys read from a log structure merge (LSM) tree within a preset duration, determining a total size of the read hot keys, and adjusting a size of each of a plurality of levels of the LSM tree based on the total size of the read hot keys, data reading performance is increased by adjusting the size of levels.

While the present disclosure has been shown and described with reference to certain example embodiments thereof, it should be understood by those skilled in the art that various changes in form and details may be made therein without departing from the principle and spirit of the present disclosure.

What is claimed is:

1. A data processing method, comprising:
acquiring hot keys read from a log structure merge (LSM) tree within a preset duration;
determining a total size of the read hot keys;
adjusting a size of each of a plurality of levels of the LSM tree based on the determined total size of the read hot keys,
wherein the acquiring of hot keys read from the log structure merge (LSM) tree within a preset duration comprises:
determining a reading hotness threshold; and
acquiring hot keys determined based on the reading hotness threshold, and
wherein the adjusting of the size of each of the plurality of levels of the LSM tree based on the total size of the read hot keys comprises:
determining a total size of an upper level of a current level in the plurality of levels within the preset duration; and
adjusting the size of each of the plurality of levels based on the total size of the read hot keys and the total size of the upper level of the current level.

2. The method according to claim 1, wherein the adjusting of the size of each of the plurality of levels based on the total size of the read hot keys and the total size of the upper level of the current level comprises:
comparing the total size of the read hot keys and the total size of the upper level of the current level to obtain a comparison result;
determining whether to adjust the size of each of the plurality of levels based on the comparison result; and
adjusting, when it is determined to adjust the size of each of the plurality of levels, the size of each level in the plurality of levels according to a first rule.

3. The method according to claim 2, wherein the determining of whether to adjust the size of each of the plurality of levels based on the comparison result comprises:
determining to adjust the size of each of the plurality of levels, when the total size of the read hot keys is in the range of a first multiple of the total size of the upper level of the current level;
determining not to adjust the size of each of the plurality of levels, when the total size of the read hot keys is in the range of a second multiple of the total size of the upper level of the current level; and
when the total size of the read hot key is in a third or fourth multiple of the total size of the upper level of the current level, updating the reading hotness threshold according to a second rule, and returning to the acquiring of all hot keys determined based on the reading hotness threshold in the keys read from the LSM tree within the preset duration.

4. The method according to claim 2, wherein the adjusting of the size of each level in the plurality of levels according to the first rule comprises:

reducing a size of a first number of levels from top to bottom in the plurality of levels by a first preset proportion of a first value, respectively; and increasing a size of a second number of levels from bottom to top in the plurality of levels by a second preset proportion of the first value, respectively.

5. The method according to claim 1, wherein the determining of a total size of an upper level of a current level in the plurality of levels within the preset duration comprises:

determining a sum of keys in data files of all levels located above the current level in the preset duration as the total size of the upper level of the current level within the preset duration.

6. The method according to claim 1, further comprising:

acquiring a merged file that is obtained by merging a current data file in a current level in the plurality of levels and a data file overlapping with the current data file in the next level of the current level, wherein the merged file comprises at least one key;

determining whether each of the at least one key is a hot key or a cold key; and distributing the hot key in the at least one key to the current level, and distributing the cold key in the at least one key to the next level.

7. The method according to claim 6, wherein the determining of whether each of the at least one key is a hot key or a cold key comprises:

determining whether each of the at least one key is a hot key or a cold key based on access numbers of the key.

8. The method according to claim 7, wherein the determining of whether each of the at least one key is a hot key or a cold key based on access numbers of a key comprises:

determining the total size of the keys in the current data file, as a first value;

acquiring the access numbers of the at least one key, determining the total size of the keys, the access numbers of which are in a preset range, in at least one key, as a second value;

determining a size of a first key in a first data file arranged after the current data file in the current level, as a third value;

selecting a key whose size does not exceed half of the first value from the at least one key according to an order of the access number from high to low when the first value is less than the second value, and selecting a key whose size does not exceed the second value from the at least one key according to an order of the access number from high to low when the second value is less than the first value; and determining a key less than the third value in the selected key to be the hot key, and determining a key other than the hot key in the at least one key to be the cold key.

9. A data processing device, comprising:

a processor; and a memory storing computer executable instructions, wherein the computer executable instructions, when executed by the processor, cause the processor:

acquire hot keys read from a log structure merge (LSM) tree within a preset duration;

determine a total size of the read hot keys; and adjust a size of each of a plurality of levels of the LSM tree based on the total size of the read hot keys, wherein acquiring hot key reads from the LSM tree within a preset duration includes:

determining a reading hotness threshold;

acquiring hot keys determined based on the reading hotness threshold, and wherein adjusting the size of each of the plurality of levels of the LSM tree based on the total size of the read hot keys includes:

determining a total size of an upper level of a current level in the plurality of levels within the preset duration; and adjusting the size of each of the plurality of levels based on the total size of the read hot keys and the total size of the upper level of the current level.

10. The device according to claim 9, wherein adjusting the size of each of the plurality of levels of the LSM tree based on the total size of the read hot keys further includes:

comparing the total size of the read hot keys and the total size of the upper level of the current level to obtain a comparison result;

determining whether to adjust the size of each of the plurality of levels based on the comparison result; and adjusting, when it is determined to adjust the size of each of the plurality of levels, the size of each level in the plurality of levels according to a first rule.

11. The device according to claim 10, wherein adjusting the size of each of the plurality of levels of the LSM tree based on the total size of the read hot keys further includes:

determining to adjust the size of each of the plurality of levels, when the total size of the read hot keys is in the range of a first multiples of the total size of the upper level of the current level;

determining not to adjust the size of each of the plurality of levels, when the total size of the read hot keys is in the range of a second multiples of the total size of the upper level of the current level; and when the total size of the read hot key is in a third or fourth multiples of the total size of the upper level of the current level, update the reading hotness threshold according to the second rule, and return to acquire of all hot keys determined based on the reading hotness threshold in the keys read from the LSM tree within the preset duration.

12. The device according to claim 10, wherein adjusting the size of each of the plurality of levels of the LSM tree based on the total size of the read hot keys further includes:

reducing a size of a first number of levels from top to bottom in the plurality of levels by a first preset proportion of a first value, respectively; and increasing a size of a second number of levels from bottom to top in the plurality of levels by a second preset proportion of the first value, respectively.

13. The device according to claim 9, wherein adjusting the size of each of the plurality of levels of the LSM tree based on the total size of the read hot keys further includes:

determining a sum of keys in data files of all levels located above the current level in the preset duration as the total size of the upper level of the current level within the preset duration.

14. The device according to claim 9, wherein the computer executable instructions, when executed by the processor, further cause the processor to:

acquire a merged file that is obtained by merging a current data file in a current level in the plurality of levels and a data file overlapping with the current data file in the next level of the current level, wherein the merged file comprises at least one key;

determine whether each of the at least one key is a hot key or a cold key; and distribute the hot key in the at least one key to the current level, and distributing the cold key in the at least one key to the next level.

15. The device according to claim 14, wherein determining whether each of the at least one key is a hot key or a cold key includes:
- determining whether each of the at least one key is a hot key or a cold key based on access numbers of the key.

16. The device according to claim 15, wherein determining whether each of the at least one key is a hot key or a cold key includes:
- determining the total size of the keys in the current data file, as a first value;
- acquiring the access numbers of the at least one key, determining the total size of the keys, the access numbers of which are in a preset range, in at least one key, as a second value;
- determining a size of a first key in a first data file arranged after the current data file in the current level, as a third value;
- selecting a key whose size does not exceed half of the first value from the at least one key according to an order of the access number from high to low when the first value is less than the second value, and selecting a key whose size does not exceed the second value from the at least one key according to an order of the access number from high to low when the second value is less than the first value; and
- determining a key less than the third value in the selected key to be the hot key, and determine a key other than the hot key in the at least one key to be the cold key.

* * * * *